United States Patent
Ku et al.

(10) Patent No.: US 7,930,298 B2
(45) Date of Patent: Apr. 19, 2011

(54) SYSTEM AND METHOD FOR GENERATING 'SNAPSHOT'S OF LEARNING OBJECTS

(75) Inventors: Tsun Ku, Taipei (TW); Yi-Chi Chen, Taipei County (TW); Chien-Huei Yang, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 577 days.

(21) Appl. No.: 12/005,375

(22) Filed: Dec. 27, 2007

(65) Prior Publication Data
US 2009/0138442 A1    May 28, 2009

(30) Foreign Application Priority Data
Nov. 27, 2007   (TW) .................................. 96144930 A (51) Int. Cl.
*G06F 7/00* (2006.01)
(52) U.S. Cl. ........................................................ 707/721
(58) Field of Classification Search ................... 707/721
See application file for complete search history.

(56) References Cited

U.S. PATENT DOCUMENTS
2005/0071328 A1*   3/2005   Lawrence .................... 707/3
* cited by examiner Primary Examiner — John Breene
Assistant Examiner — Joshua Bullock
(74) Attorney, Agent, or Firm — Birch, Stewart, Kolasch & Birch, LLP (57) ABSTRACT

A system for generating a 'snapshot' of a learning object is provided. An interface receives a target object and a user identification number. The target object corresponds to a category, comprising a plurality of sentences and multimedia data, wherein the sentences comprise at least one keyword. A learning object database comprises a plurality of learning objects and a user's historical learning record. Each of the learning objects corresponds to at least one category, and comprises at least one keyword. The user's historical learning record comprises a track record of learning objects used corresponding to the user identification number. A script preview unit selects at least one of the sentences of the target object according to the user's historical learning record corresponding to the user identification number. A multimedia preview unit selects one of the multimedia data of the target object, wherein the selected multimedia data is highly related to the selected sentence. A 'snapshot' generator generates a 'snapshot' of the target object by combining the selected sentence and the selected multimedia data, and directs a display device to display the 'snapshot'.

12 Claims, 6 Drawing Sheets

| relationship value R | sentence S1 | sentence S2 | sentence S3 | sentence S4 | sentence S5 | sentence S6 | sentence S7 | sum of relationship value |
|---|---|---|---|---|---|---|---|---|
| sentence S1 | - | 0.092308 | 0.04878 | 0 | 0 | 0.029851 | 0.017544 | 0.188483 |
| sentence S2 | 0.092308 | - | 0 | 0 | 0 | 0 | 0 | 0.092308 |
| sentence S3 | 0.04878 | 0 | - | 0 | 0 | 0.0625 | 0.018018 | 0.178079 |
| sentence S4 | 0 | 0 | 0 | - | 0.028571 | 0.056338 | 0 | 0.13369 |
| sentence S5 | 0 | 0 | 0 | 0.028571 | - | 0 | 0 | 0.028571 |
| sentence S6 | 0.029851 | 0 | 0.0625 | 0.056338 | 0 | - | 0.029412 | 0.178101 |
| sentence S7 | 0.017544 | 0 | 0.018018 | 0 | 0 | 0.029412 | - | 0.064974 |

SYSTEM AND METHOD FOR GENERATING 'SNAPSHOT'S OF LEARNING OBJECTS

BACKGROUND

The invention relates to data processing, and in particular to systems and methods for generating a 'snapshot' of a learning object.

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many learning resource databases provide Application Programming Interface (API) for other website access, and use SQI (Simple Query Interface) to define an interface to facilitate cross-site search operations.

Generally, cross-site search operations locate large amounts of learning objects, and description of these learning objects does not provide adequate information to meet user requirements.

According to a conventional method, a provider of a learning object can generate a 'snapshot' of the learning object by composing an abstract of the learning object, and combining the abstract with pictures pertinent to the learning object.

The conventional method, however, is inconvenient for the provider of the learning object. In addition, the 'snapshot' is composed from the viewpoint of the provider. Accordingly, contents of the 'snapshot' do not provide adequate information for a user to determine whether he/she is interested in the learning object. Even though the learning object has a 'snapshot', it is still inconvenient for a user to use it.

Hence, there is a need for a method and system for generating a 'snapshot' of a learning object better addressing the problems arising from the existing technology.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A system for generating a 'snapshot' of a learning object is provided. The system for generating a 'snapshot' of a learning object comprises an interface, a learning object database, a script preview unit, a multimedia preview unit, and a 'snapshot' generator. The interface receives a target object and a user identification number. The target object corresponds to a category, comprising a plurality of sentences and multimedia data, wherein the sentences comprise at least one target object keyword. The learning object database comprises a plurality of learning objects and a user's historical learning record. Each of the learning objects corresponds to at least one category and comprises at least one learning object keyword. The user's historical learning record comprises a track record of learning objects used corresponding to the user identification number. The script preview unit selects at least one of the sentences of the target object as a preview sentence according to the user's historical learning record corresponding to the user identification number. The multimedia preview unit selects one of the multimedia data of the target object as a preview multimedia data, wherein the selected multimedia data is highly related to the selected sentence. The 'snapshot' generator generates a 'snapshot' of the target object by combining the preview sentence and the preview multimedia data, and directs a display device to display the 'snapshot'.

Also provided is a method for generating a 'snapshot' of a learning object. A target object is received. The target object corresponds to a category. The target object comprises a plurality of sentences and multimedia data, wherein the sentences comprise at least one target object keyword. A user identification number is received. A learning object database is provided. The learning object database comprises a plurality of learning objects and a user's historical learning record. Each of the learning objects corresponds to at least one category and comprises at least one learning object keyword. The user's historical learning record comprises a track record of learning objects used corresponding to the user identification number. At least one of the sentences of the target object is selected as a preview sentence according to the user's historical learning record corresponding to the user identification number. One of the multimedia data of the target object is selected as a preview multimedia data, wherein the selected multimedia data is highly related to the selected sentence. A 'snapshot' of the target object is generated by combining the preview sentence and the preview multimedia data. The 'snapshot' is then displayed.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that the many of the elements described and illustrated throughout the specification are functional in nature and may be embodied in one or more physical entities or may take other forms beyond those described or depicted.

Figure 1:
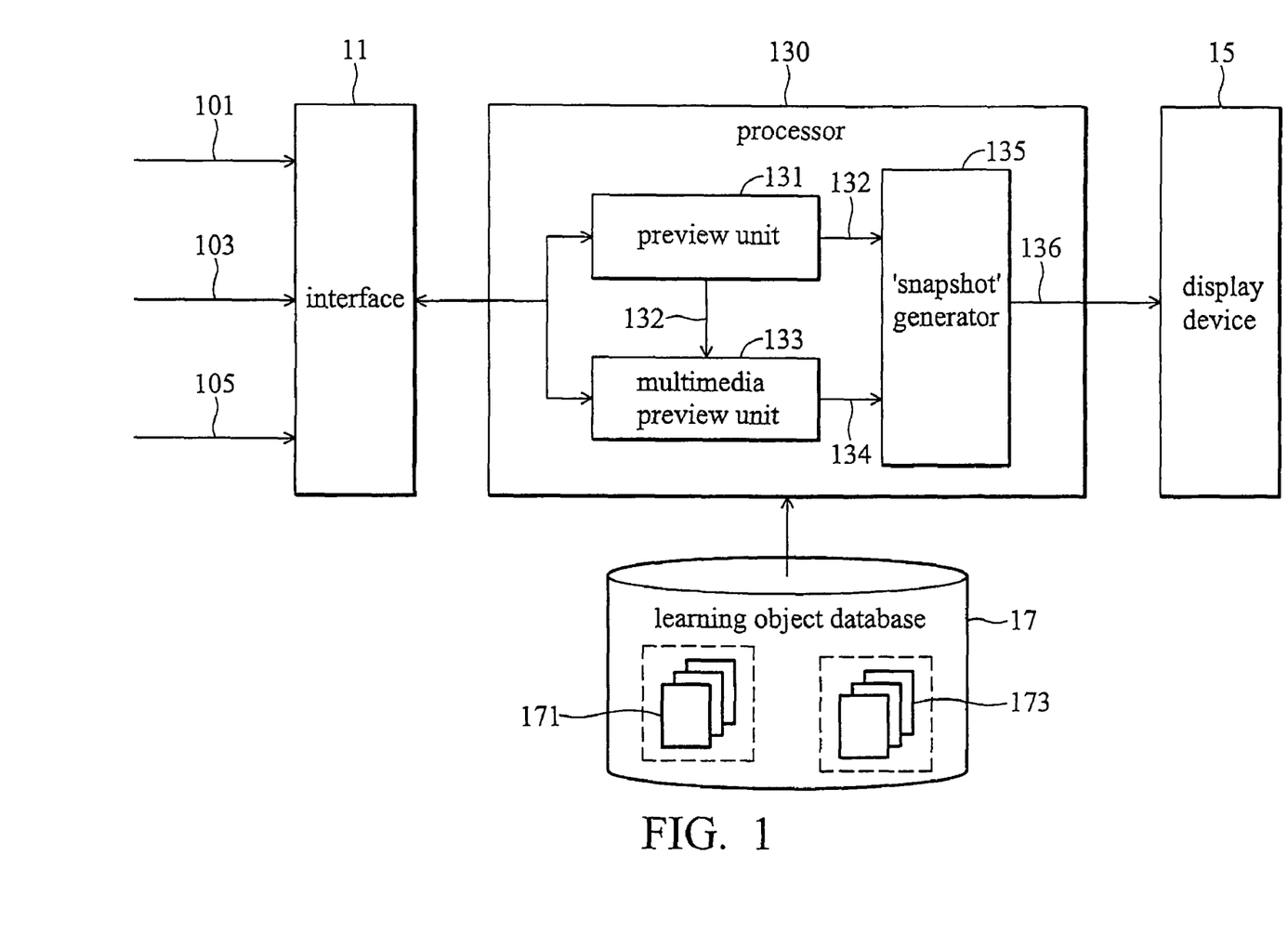
FIG. 1 illustrates a schematic view of an embodiment of a system for generating a 'snapshot' of a learning object.

FIG. 1 illustrates a schematic view of an embodiment of a system for generating a 'snapshot' of a learning object. The system for generating a 'snapshot' of a learning object can be implemented in any electronic device capable of computing, such as a personal computer. According to this embodiment, a personal computer is utilized as an example of the system for generating a 'snapshot' of a learning object, comprising: an interface 11, processor 130, display device 15, and a learning object database 17.

The learning object database 17 comprises plurality of learning objects 171 and a plurality of items of user's historical learning record 173.

Each of the learning objects 171 corresponds to at least one category, and each of learning objects 171 comprises at least one learning object keyword.

Each item of the user's historical learning record 173 comprises a track record of learning objects used corresponding to a specific user identification number. For example, name of learning objects 171 that are used, a user identified by the specific user identification number, as well as categories to which the learning objects 171 are corresponded to, and keywords comprised in the learning objects 171.

Interface 11 receives a target object 101. The target object 101 corresponds to a category, comprising a plurality of sentences and multimedia data, wherein the sentences comprise at least one keyword (target object keyword). The sentence is constituted by text. The multimedia data comprises video and/or audio data, figures, tables, and other types of data.

Interface 11 also receives a user identification number 103, such as a user name and/or password.

A keyword 105 can also be provided, when a 'snapshot' in connection with the keyword 105 is to be generated based on the target object 101.

Processor 130 comprises a script preview unit 131, a multimedia preview unit 133, and a 'snapshot' generator 135.

The script preview unit 131 selects at least one of the sentences of the target object 101 as a preview sentence 132 according to the user's historical learning record 173 corresponding to the user identification number 103. The way in which the script preview unit 131 selects the preview sentence 132 is described later. The preview sentence 132 selected by the script preview unit 131 is provided to the multimedia preview unit 133 and the 'snapshot' generator 135 for further use.

The multimedia preview unit 133 selects one of the multimedia data of the target object 101 as a preview multimedia data 134, wherein the selected multimedia data is highly related to the preview sentence 132. The way in which the multimedia preview unit 133 selects the preview multimedia data 134 is described later. The preview multimedia data 134 selected by multimedia preview unit 133 is provided to the 'snapshot' generator 135 for further use.

The 'snapshot' generator 135 generates a 'snapshot' 136 of the target object 101 by combining the preview sentence 132 and the preview multimedia data 134, and directs a display device 15 to display the 'snapshot' 136.

Figure 2:
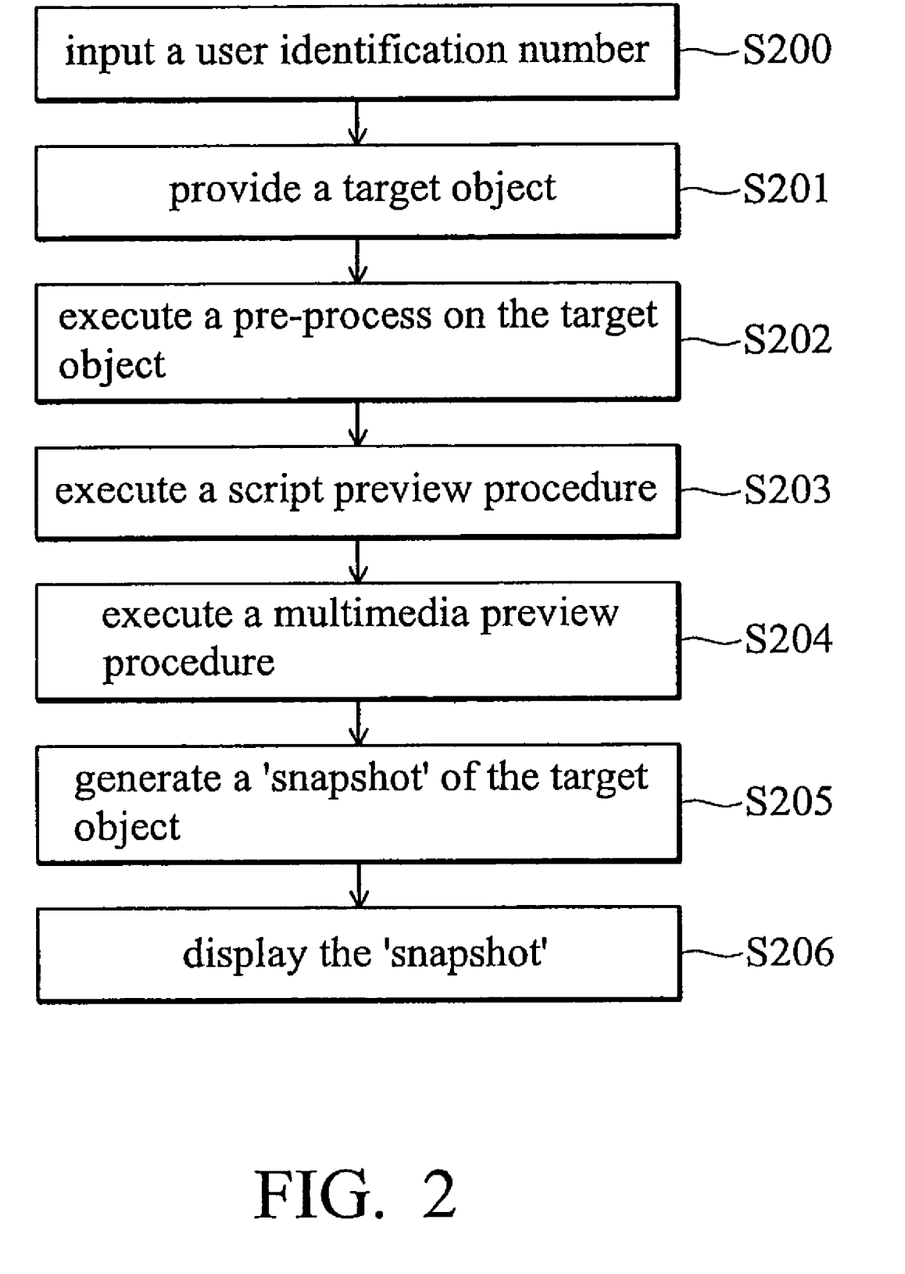
FIG. 2 is a flowchart of an embodiment of a method for generating a 'snapshot' of a learning object.

FIG. 2 is a flowchart of an embodiment of a method for generating a 'snapshot' of a learning object. The method for generating a 'snapshot' of a learning object can be implemented in the system for generating a 'snapshot' of a learning object of FIG. 1. In other words, the method can be implemented in any electronic device capable of computing, such as a personal computer.

In the method of FIG. 2, a customized learning object 'snapshot' is generated automatically according to a user identification number and a keyword input by a user.

In step S200, a user identification number is input, such as a user name and/or password.

In step S201, a target object is provided. The target object is a user-defined target of analysis. The target object can be a learning object corresponding to a category and comprising a plurality, of sentences and multimedia data, wherein the sentences comprise at least one keyword (target object keyword). The sentence is constituted by text. The multimedia data comprises video and/or audio data, figures, tables, and other types of data.

In step S202, a pre-process is executed on the target object. Here, the pre-process comprises a step of separating text data and multimedia data comprised in the target object.

In step S203, a script preview procedure is executed, wherein at least one of the sentences of the target object is selected as a preview sentence according to the user's historical learning record corresponding to the user identification number. Details of the script preview procedure are described later.

In step S204, a multimedia preview procedure is executed, wherein one of the multimedia data of the target object is selected as a preview multimedia data, wherein the selected multimedia data is highly related to the selected sentence. Details of the multimedia preview procedure are described later.

In step S205, a 'snapshot' of the target object is generated by combining the preview sentence and the preview multimedia data.

In step S206, the 'snapshot' generated in step S205 is displayed on a display device.

Figure 3:
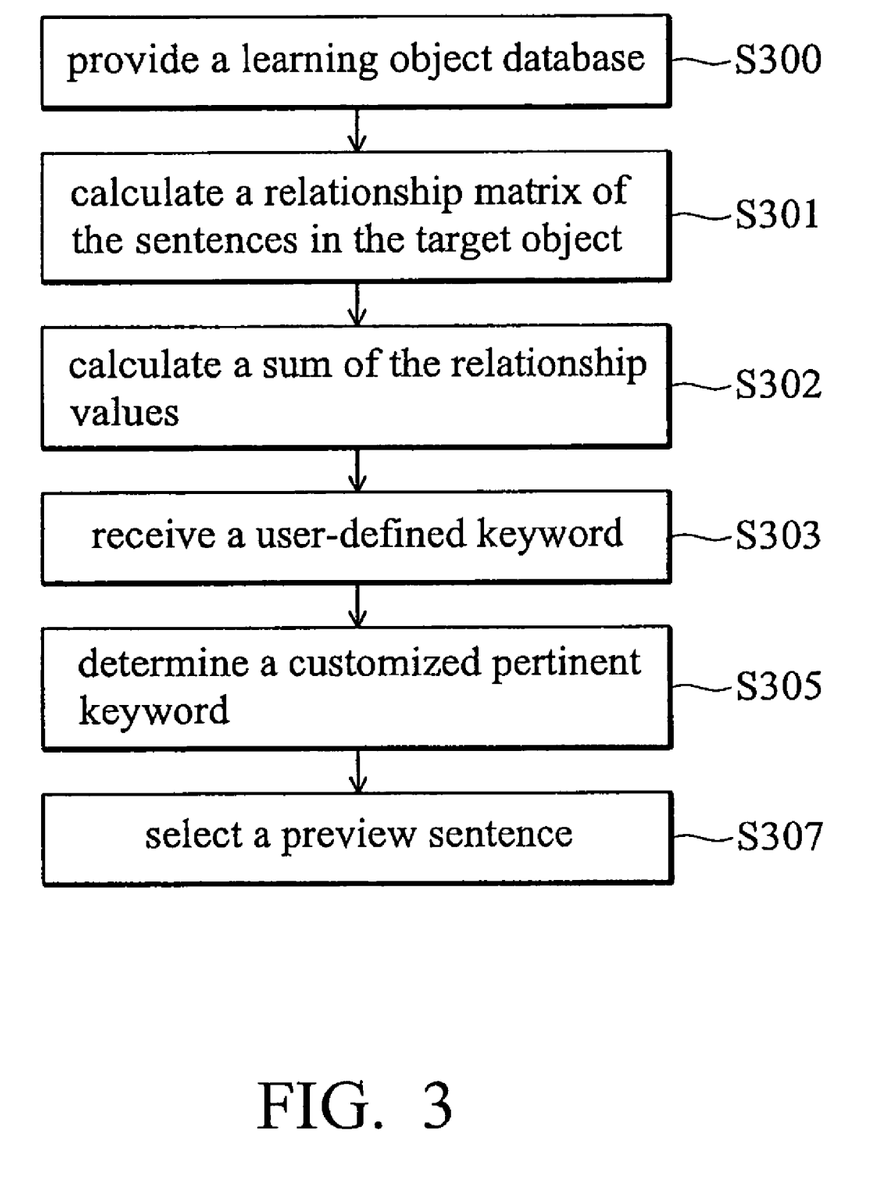
FIG. 3 is a flowchart of the script preview procedure of FIG. 2.

FIG. 3 is a flowchart of the script preview procedure of FIG. 2.

In step S300, a learning object database is provided. The learning object database comprises a plurality of learning objects and a user's historical learning record. Each of the learning objects corresponds to at least one category and comprises at least one learning object keyword. The user's historical learning record comprises a track record of learning objects used corresponding to the user identification number.

In step S301, a relationship matrix of the plurality of sentences in the target object is calculated, wherein the relationship matrix comprises a relationship value R for each pair of the plurality of sentences. The relationship value of sentences Si and Sj is calculated according to the following equation:

$$R(i, j) = \frac{(Ui \cap Uj) \times 2}{Ui \cup Uj} \quad (1)$$

Ui represents binary terms in the sentence Si of the target object, Uj represents binary terms in the sentence Sj of the target object, Ui∪Uj represents a total number of the binary terms of Ui and Uj, and Ui∩Uj represents a number of binary terms appearing in both Ui and Uj.

According to equation (1), binary terms are used as a basis of calculation. Therefore, the numerator is multiplied by 2. Accordingly, the multiplier for the numerator of equation (1) can be changed when different calculation basis is adopted for equation (1).

Figure 4:
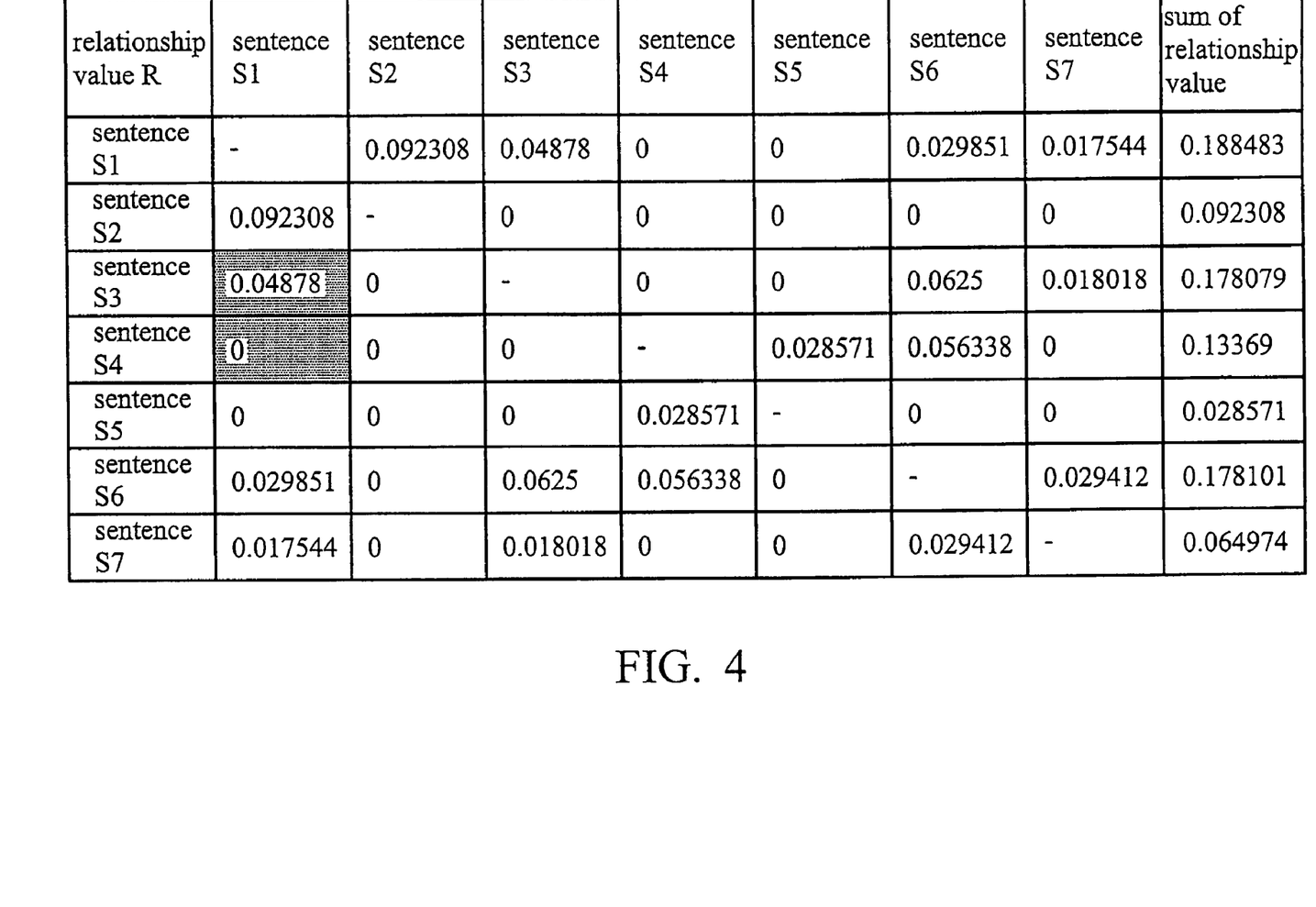
FIG. 4 illustrates an example of the relationship matrix generated in step S301 of FIG. 3.

FIG. 4 illustrates an example of the relationship matrix generated in step S301 of FIG. 3. Here, the target object comprises sentences S1-S7. The relationship matrix shown in FIG. 4 comprises the relationship value of each pair of sentences S1-S7.

In step S302, a sum of the relationship values of each of the sentences S1-S7 and other sentences of the sentences S1-S7 is calculated. The relationship matrix shown in FIG. 4 comprises the sum of the relationship values of each of the sentences S1-S7 and other sentences of the sentences S1-S7.

In step S303, a user-defined keyword (user keyword) A is received.

In step S305, a customized pertinent keyword is determined. The pertinent keyword is determined by selecting a pertinent keyword B relating to the target object from the plurality of learning objects according to the user's historical learning record corresponding to the user identification number. Details of step S305 are described later.

In step S307, the sentence is selected from the target object and is regarded as the preview sentence. The selected sentence contains the largest amount of information among the sentences (i.e., the sentence having a relationship value higher than the others) and contains the user keyword A and/or the pertinent keyword B. The preview sentence is selected according to the relationship values of each of sentences S1-S7 calculated in step S302, the user keyword A received in step S303, and the pertinent keyword B determined in step S305.

Referring to FIG. 4, among sentences S1-S7, sentences having higher relationship values are sentences S1, S6, S3, and S4 (in a high-to-low order). When 3 preview sentences are to be selected, sentences S1, S6, and S3 are selected (without considering keywords comprised in these sentence). When keywords are taken into account (such as keyword A and/or B), sentences comprising keyword A and/or B are first selected, and the sentences having higher relationship values are then selected as the preview sentences from the selected sentences.

Figure 5:
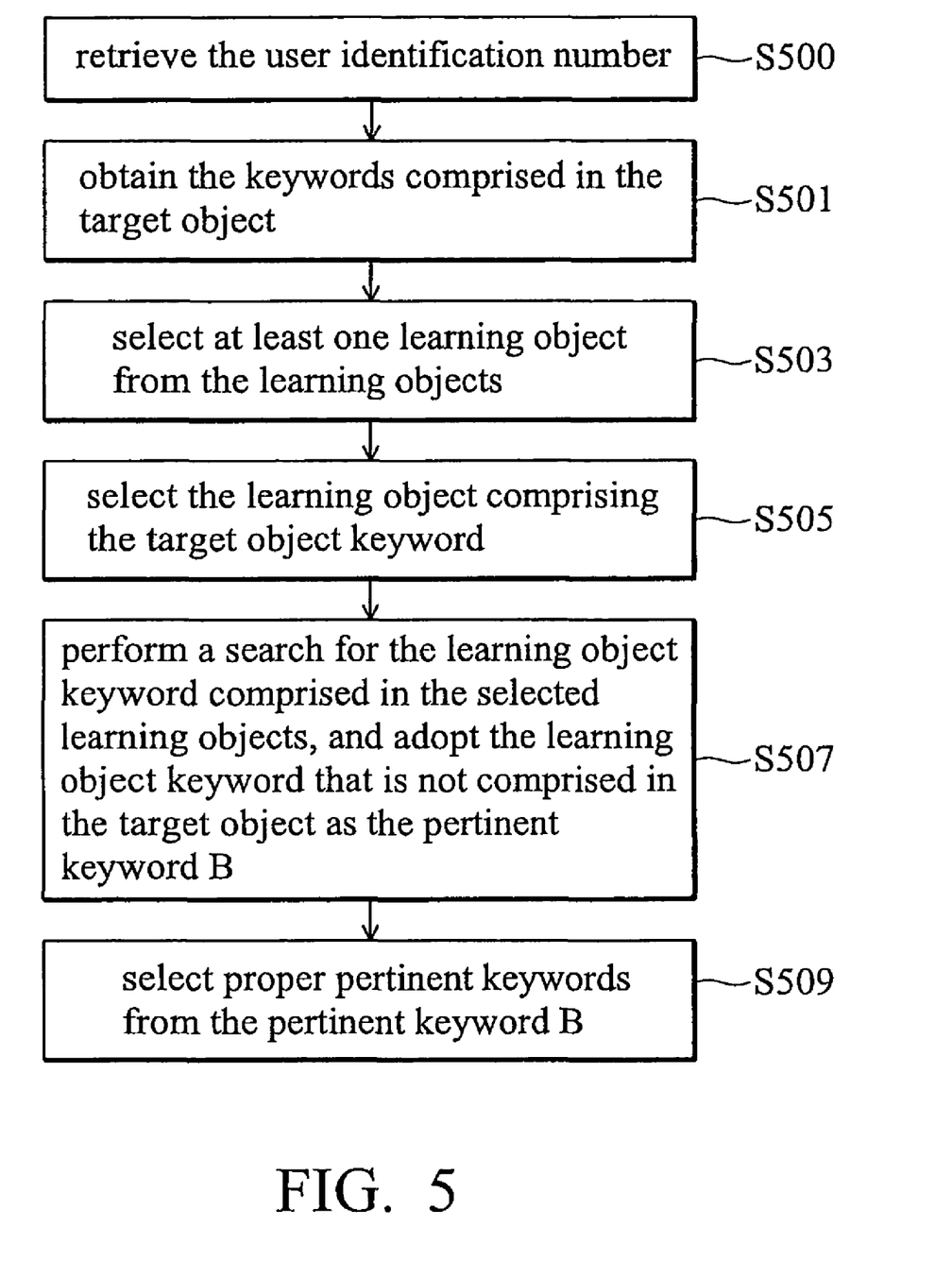
FIG. 5 is a flowchart of the procedure of determining the pertinent keyword of FIG. 3.

FIG. 5 is a flowchart of the procedure of determining the pertinent keyword of FIG. 3. The procedure of determining the pertinent keyword is determining a keyword other than the user keyword which the user may be interested in. The pertinent keyword is determined according to category and keyword corresponding to learning objects of the learning object database, as well as the user's historical learning record of the learning object database.

In step S500, the user identification number is retrieved, wherein the user identification number is input by a user.

In step S501, the keywords comprised in the target object are obtained, as well as the category corresponding to the target object. Here, the target object corresponds to category 1 and category 2; the target object comprises keyword 1 and keyword 2.

In step S503, at least one learning object is selected from the plurality of learning objects according to the user's historical learning record, wherein the selected learning object has the category identical with the target object and has been used by a user identified by the user identification number. For example, a set of learning objects (learning object set 1) is selected, wherein the learning objects within the learning object set 1 corresponds to category 1 and category 2. A set of learning objects (learning object set 2) is selected from learning object set 1, wherein the learning object set 2 comprises learning objects that have been used by a user identified by the user identification number.

In step S505, the learning object comprising the target object keyword is selected from the learning objects selected in step S503. For example, a set of learning objects (learning object set 3) is selected from learning object set 2, wherein the learning object set 3 comprises learning objects containing the keyword 1 or keyword 2.

In step S507, a search is performed for the learning object keyword comprised in the learning objects selected in step S505, and the learning object keyword that is not comprised in the target object is adopted as the pertinent keyword B. For example, a plurality of learning objects are comprised in learning object set 3. In addition to keyword 1 and keyword 2, the learning objects of learning object set 3 comprise keyword 3, keyword 4, and keyword 5. Accordingly, keyword 3, keyword 4, and keyword 5 are selected as preliminary pertinent keywords.

If too many pertinent keywords are used in the method of generating a 'snapshot' of a learning object, inefficiencies of the process would occur and the results obtained would be greatly affected. Accordingly, step S509 can be performed to further select proper pertinent keywords from the pertinent keyword determined in step S507. For example, among keyword 3, keyword 4, and keyword 5, the one which is contained in a learning object that has been accessed recently is selected as the pertinent keyword. For example, keyword 3 is contained in a learning object that has been accessed recently. Accordingly, keyword 3 is selected as the pertinent keyword for determining the preview sentence.

Figure 6:
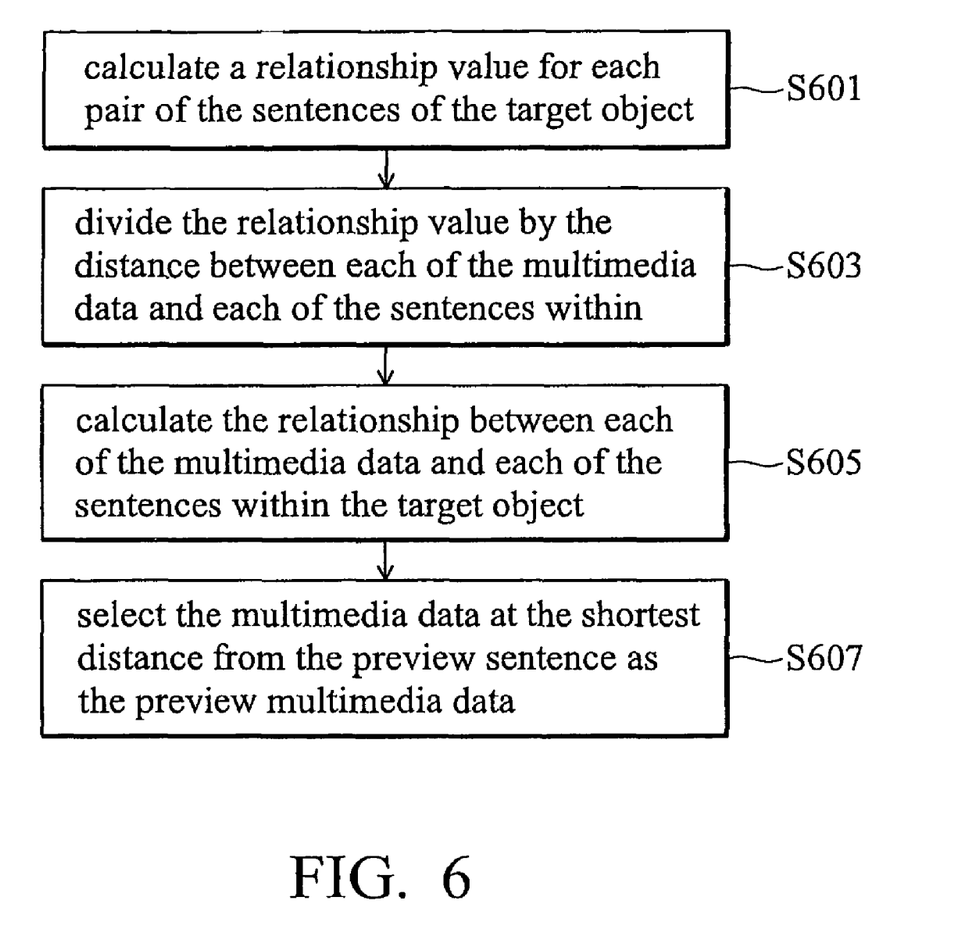
FIG. 6 is a flowchart of the multimedia preview procedure of FIG. 2.

FIG. 6 is a flowchart of the multimedia preview procedure of FIG. 2.

In step S601, a relationship value for each pair of the sentences of the target object is calculated, wherein the relationship value calculated in step S301 can be used (i.e., the $$R(i, j) = \frac{(Ui \cap Uj) \times 2}{Ui \cup Uj}$$

of equation (1)).

In step S603, the relationship value is divided by the distance between each of the multimedia data and each of the sentences within the target object to obtain the relationship between each of the multimedia data and each of the sentences within the target object. For example, distance between multimedia data and a sentence is presented by 'number of characters' located between the multimedia data and the sentence. The distance between sentence Si and multimedia data Gj is presented by d(Si,Gj).

In step S605, the relationship between each of the multimedia data and each of the sentences within the target object is calculated according to the R(i,j) obtained in step S601 and the d(Si,Gi) determined in step S603. The relationship is calculated according to the following equation:

$$RG(i, j) = \frac{R(i, j)}{d(Si, Gj)} \quad (2)$$

In equation (2), $$R(i, j) = \frac{(Ui \cap Uj) \times 2}{Ui \cup Uj},$$

Ui represents binary terms in the sentence Si of the target object, Uj represents binary terms in the sentence Sj of the target object, Ui∪Uj represents a total number of the binary terms of Ui and Uj, Ui∩Uj represents a number of binary terms appearing in both Ui and Uj, and d(Si,Gi) represents physical distance between multimedia data Gj and sentence Si.

The relationship determined in step S605 can be presented as a relationship matrix.

In step S607, the multimedia data at the shortest distance from the preview sentence is selected as the preview multimedia data according to the relationship matrix.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for generating a 'snapshot' of a learning object, comprising:
    an interface, receiving:
        a target object, corresponding to a category, comprising a plurality of sentences and multimedia data, wherein the sentences comprise at least one target object keyword; and
        a user identification number;
    a learning object database, comprising:
        a plurality of learning objects, wherein each of the learning objects corresponds to at least one category and comprises at least one learning object keyword;
        a user's historical learning record, comprising a track record of learning objects used corresponding to the user identification number; and
        a user keyword input by a user;
    a script preview unit, selecting at least one of the sentences of the target object as a preview sentence according to the user's historical learning record corresponding to the user identification number, the script preview unit performing steps of:
        calculating the amount of information contained in the plurality of sentences of the target object; which includes:
            calculating a relationship matrix of the plurality of sentences in the target object, wherein the relationship matrix comprises a relationship value for each pair of the plurality of sentences; and
            calculating a sum of the relationship values of each of the plurality of sentences and other sentences of the plurality of sentences as a value specifying the amount of information thereof;
        selecting at least one pertinent keyword relating to the target object from the plurality of learning objects according to the user's historical learning record corresponding to the user identification number; and
        selecting the sentence, among the plurality of sentences, that contains the largest amount of information and the user keyword or the pertinent keyword as the preview sentence;
    a multimedia preview unit, selecting one of the multimedia data of the target object as a preview multimedia data, wherein the selected multimedia data is highly related to the selected sentence; and
    a 'snapshot' generator, generating a 'snapshot' of the target object by combining the preview sentence and the preview multimedia data, and directing a display device to display the 'snapshot'.

2. The system for generating a 'snapshot' of a learning object of claim 1, wherein the script preview unit further calculates the relationship value of each pair of the plurality of sentences according to the following equation:

$$R(i, j) = \frac{(Ui \cap Uj) \times 2}{Ui \cup Uj},$$

wherein Ui represents binary terms in the sentence Si of the target object, Uj represents binary terms in the sentence Sj of the target object, Ui∪Uj represents a total number of the binary terms of Ui and Uj, and Ui∩Uj represents a number of binary terms appearing in both Ui and Uj.

3. The system for generating a 'snapshot' of a learning object of claim 1, wherein the script preview unit further performs the following steps when selecting at least one pertinent keyword relating to the target object from the plurality of learning objects:
    (A) selecting the learning objects which have the category identical with the target object, and have been used by a user identified by the user identification number, from the plurality of learning objects according to the user's historical learning record;
    (B) selecting the learning object comprising the target object keyword from the learning objects selected in step (A);
    (C) searching for the learning object keyword comprised in the learning objects selected in step (B), and selecting the learning object keyword that is not comprised in the target object as the pertinent keyword.

4. The system for generating a 'snapshot' of a learning object of claim 1, wherein the multimedia preview unit further performs steps of:
    calculating a multimedia distance matrix by calculating a distance between each multimedia data and each of the sentences within the target object; and
    calculating a multimedia relationship matrix by calculating a relationship between each of the multimedia data and each of the sentences within the target object to locate the multimedia data at the shortest distance from the preview sentence.

5. The system for generating a 'snapshot' of a learning object of claim 4, wherein the multimedia preview unit further performs the following steps when calculating the relationship between each of the multimedia data and each of the sentences within the target object:
    calculating the relationship value of each pair of the sentences of the target object; and
    dividing the relationship value by the distance between each of the multimedia data and each of the sentences within the target object to obtain the relationship between each of the multimedia data and each of the sentences within the target object.

6. The system for generating a 'snapshot' of a learning object of claim 5, wherein the multimedia preview unit calculates the relationship between each of the multimedia data and each of the sentences within the target object according to the following equation:

$$RG(i, j) = \frac{R(i, j)}{d(Si, Gj)},$$

wherein $$R(i, j) = \frac{(Ui \cap Uj) \times 2}{Ui \cup Uj},$$

Ui represents binary terms in the sentence Si of the target object, Uj represents binary terms in the sentence Sj of the target object, Ui∪Uj represents a total number of the binary terms of Ui and Uj, Ui∩Uj represents a number of binary terms appearing in both Ui and Uj, and d(Si,Gi) represents physical distance between multimedia data Gj and sentence Si.

7. A method for generating a 'snapshot' of a learning object, comprising:
   receiving a target object corresponding to a category, wherein the target object comprises a plurality of sentences and multimedia data, and the sentences comprise at least one target object keyword;
   receiving a user identification number;
   providing a learning object database, comprising:
      a plurality of learning objects, wherein each of the learning objects corresponds to at least one category and comprises at least one learning object keyword; and
      a user's historical learning record comprising a track record of learning objects used corresponding to the user identification number;
   selecting at least one of the sentences of the target object as a preview sentence according to the user's historical learning record corresponding to the user identification number;
   selecting one of the multimedia data of the target object as a preview multimedia data, wherein the selected multimedia data is highly related to the selected sentence;
   generating a 'snapshot' of the target object by combining the preview sentence and the preview multimedia data, and displaying the 'snapshot';
   receiving a user keyword input by a user;
   calculating the amount of information contained in the plurality of sentences of the target object, further comprises:
      calculating a relationship matrix of the plurality of sentences in the target object, wherein the relationship matrix comprises a relationship value for each pair of the plurality of sentences; and
      calculating a sum of the relationship values of each of the plurality of sentences and other sentences of the plurality of sentences as a value specifying the amount of information thereof;
   selecting at least one pertinent keyword relating to the target object from the plurality of learning objects according to the user's historical learning record corresponding to the user identification number; and
   selecting the sentence, among the plurality of sentences, that contain the largest amount of information and contain the user keyword or the pertinent keyword as the preview sentence.

8. The method for generating a 'snapshot' of a learning object claim 7, wherein the relationship value of each pair of the plurality of sentences is calculated according to the following equation:

$$R(i, j) = \frac{(Ui \cap Uj) \times 2}{Ui \cup Uj},$$

wherein Ui represents binary terms in the sentence Si of the target object, Uj represents binary terms in the sentence Sj of the target object, Ui∪Uj represents a total number of the binary terms of Ui and Uj, and Ui∩Uj represents a number of binary terms appearing in both Ui and Uj.

9. The method for generating a 'snapshot' of a learning object of claim 7, wherein the step of selecting at least one pertinent keyword relating to the target object from the plurality of learning objects further comprises:
   (A) selecting the learning objects, which have the category identical with the target object, and have been used by a user identified by the user identification number, from the plurality of learning objects according to the user's historical learning record;
   (B) selecting the learning object comprising the target object keyword from the learning objects selected in step (A);
   (C) searching for the learning object keyword comprised in the learning objects selected in step (B), and selecting the learning object keyword that is not comprised in the target object as the pertinent keyword.

10. The method for generating a 'snapshot' of a learning object of claim 7, further comprising:
    calculating a multimedia distance matrix by calculating a distance between each multimedia data and each of the sentences within the target object; and
    calculating a multimedia relationship matrix by calculating a relationship between each of the multimedia data and each of the sentences within the target object to locate the multimedia data at the shortest distance from the preview sentence.

11. The method for generating a 'snapshot' of a learning object of claim 10, wherein the step of calculating the relationship between each of the multimedia data and each of the sentences within the target object further comprises:
    calculating the relationship value of each pair of the sentences of the target object; and
    dividing the relationship value by the distance between each of the multimedia data and each of the sentences within the target object to obtain the relationship between each of the multimedia data and each of the sentences within the target object.

12. The method for generating a 'snapshot' of a learning object of claim 11, wherein the relationship between each of the multimedia data and each of the sentences within the target object is calculated according to the following equation:

$$RG(i, j) = \frac{R(i, j)}{d(Si, Gj)},$$

wherein $$R(i, j) = \frac{(Ui \cap Uj) \times 2}{Ui \cup Uj},$$

Ui represents binary terms in the sentence Si of the target object, Uj represents binary terms in the sentence Sj of the target object, Ui∪Uj represents a total number of the binary terms of Ui and Uj, Ui∩Uj represents a number of binary terms appearing in both Ui and Uj, and d(Si,Gi) represents physical distance between multimedia data Gj and sentence Si.

* * * * *